US011863110B2

(12) United States Patent
Kim et al.

(10) Patent No.: US 11,863,110 B2
(45) Date of Patent: Jan. 2, 2024

(54) MOTOR DRIVER AND METHOD OF DRIVING MOTOR

(71) Applicant: LX SEMICON CO., LTD., Daejeon (KR)

(72) Inventors: Il Kwon Kim, Daejeon (KR); Jae Hyun Ha, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/893,308

(22) Filed: Aug. 23, 2022

(65) Prior Publication Data

US 2023/0109563 A1   Apr. 6, 2023

(30) Foreign Application Priority Data

Oct. 6, 2021   (KR) .................. 10-2021-0132050

(51) Int. Cl.
H02P 6/18 (2016.01)
H02P 6/182 (2016.01)
H02P 29/024 (2016.01)

(52) U.S. Cl.
CPC ............ H02P 6/182 (2013.01); H02P 29/024 (2013.01)

(58) Field of Classification Search
CPC ....................................... H02P 6/182
USPC ................................... 318/400.34
See application file for complete search history.

(56) References Cited

U.S. PATENT DOCUMENTS

| 4,642,536 | A | * | 2/1987 | Boyd, Jr. | ............... D06F 34/08 318/400.1 |
| 2007/0069668 | A1 | * | 3/2007 | MacKay | ................ H02P 6/182 318/400.34 |
| 2007/0069675 | A1 | * | 3/2007 | MacKay | ................ H02P 6/182 318/400.21 |
| 2013/0234634 | A1 | * | 9/2013 | Hofer | .................... A63H 30/04 318/400.09 |
| 2020/0343840 | A1 | | 10/2020 | Vanko | |

FOREIGN PATENT DOCUMENTS

JP        4467520 B2      5/2010
KR   10-1680030 B1   11/2016

* cited by examiner

*Primary Examiner* — Erick D Glass
(74) *Attorney, Agent, or Firm* — Greenberg Traurig, LLP

(57) ABSTRACT

The present disclosure relates to a motor driver and a method of driving a motor capable of driving a motor with optimum efficiency. The method of driving the brushless direct current (BLDC) motor may include an initial driving operation, a test operation of adjusting a turn-on time and a transition time in the test mode step by step, driving the BLDC motor by applying the adjusted turn-on time and the adjusted transition time, and detecting a driving error of the BLDC motor, an operation of repeating the test operation when the driving error is not detected in the test operation, and an operation of setting the turn-on time and the transition time, which are adjusted in an operation just before the driving error is detected, as a turn-on time and a transition time in an optimum driving mode.

14 Claims, 6 Drawing Sheets

MOTOR DRIVER AND METHOD OF DRIVING MOTOR

CROSS-REFERENCE TO RELATED APPLICATION

This application claims the benefit of the Korean Patent Application No. 10-2021-0132050 filed on Oct. 6, 2021, which are hereby incorporated by reference as if fully set forth herein.

FIELD OF THE INVENTION

The present disclosure relates to a motor driver, which drives a motor with optimum efficiency suitable for characteristics and a speed of the motor, and a method of driving the motor.

BACKGROUND

Recently, brushless direct current (BLDC) motors with high energy efficiency due to not using commutation brushes are being used in various electronic devices including household appliances such as washing machines and refrigerators.

The BLDC motor may perform electronic commutation to change a current direction of a current flowing coils of an armature and may form a continuously rotating magnetic field to rotate a rotor when a position of the rotor matches with a commutation time point.

A sensorless BLDC motor driver circuit, which does not use a Hall sensor for detecting a position of a rotor, may detect a back-electro motive force generated by coils of a motor so as to detect a position of a permanent magnet of the rotor.

However, the conventional sensorless BLDC motor driver has a disadvantage in that maximum motor driving efficiency may not be utilized because a phase transition time point is fixed in a 120 degree driving method or 150 degree driving method by a mode selector.

SUMMARY

Accordingly, the present disclosure is directed to providing a motor driver capable of driving a motor with optimum efficiency by detecting a driving mode suitable for characteristics and a speed of the motor, and a method of driving the motor.

A brushless direct current (BLDC) motor driver according to one aspect of the present disclosure includes a BLDC motor including a first coil, a second coil, and a third coil, a comparator which compares a voltage of each of the first to third coils with a neutral voltage of a node commonly connected to the first to third coils in the BLDC motor and outputs a comparison result, a controller which detects a zero crossing time point of a back-electro motive force of each of the coils using the comparison result of the comparator and generates first to third coil control signals using the detected zero crossing time points and a turn-on time and a transition time in an optimum driving mode, and an inverter which supplies a first power voltage or second power voltage to the first to third coils or floats the coils in response to the first to third coil control signals.

The controller may repeatedly perform a process of driving the BLDC motor and detecting a driving error of the BLDC motor while adjusting a turn-on time and a transition time in a test mode step by step, and when the driving error is detected, may set a turn-on time and a transition time, which are adjusted in a previous operation, as the turn-on time and the transition time in the optimum driving mode.

The controller may increase the turn-on time in the test mode from 120 degrees to less than 180 degrees in a basic driving mode step by step and decrease the transition time in the test mode from 30 degrees to more than 0 degrees in the basic driving mode step by step.

When the voltage of the floated coil among the first to third coils is increased or decreased and the zero crossing time point of the back-electro motive force of the floated coil is detected, the controller may control the inverter so that the first power voltage or the second power voltage is supplied to the floated coil for the turn-on time in the optimum driving mode after the transition time in the optimum driving mode from the detected zero crossing detection time point and control the inverter so that the coil, which receives the first power voltage or the second power voltage, is floated after the turn-on time in the optimum driving mode.

The turn-on time in the optimum driving mode may be set to a "120+N" degree turn-on time corresponding to a time for which the BLDC motor rotates by "120+N" degrees (N is an integer more than 0 and less than 60), and the turn-off time of the optimum driving mode may be set to a "30−N/2" degree transition time corresponding to a time for which the BLDC motor rotates by "30−N/2" degrees.

A method of driving a brushless direct current (BLDC) motor according to another aspect of the present disclosure includes an initial driving operation of driving the BLDC motor in a basic driving mode in a test mode, a test operation of adjusting a turn-on time and a transition time in the test mode step by step, applying the adjusted turn-on time and the adjusted transition time to drive the BLDC motor, and detecting a driving error of the BLDC motor, an operation of repeating the test operation when the driving error is not detected in the test operation, and an operation, when the driving error is detected in the test operation, of setting the turn-on time and the transition time, which are adjusted in an operation just before the driving error is detected, as a turn-on time and a transition time in an optimum driving mode.

The initial driving operation may include an operation of setting the BLDC motor in a 120 degree driving mode, which is the basic driving mode, and driving the BLDC motor in an open loop manner and an operation of driving the BLDC motor in the 120 degree driving mode in a closed loop manner.

The initial driving operation may further include an operation of determining whether to rotate the BLDC motor while rotating the BLDC motor by a certain number of revolutions after driving the BLDC motor in the closed loop manner and proceed to the test operation when the BLDC motor rotates by the certain number of revolutions.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Hereinafter, embodiments of the present disclosure will be described with reference to the accompanying drawings.

Figure 1:
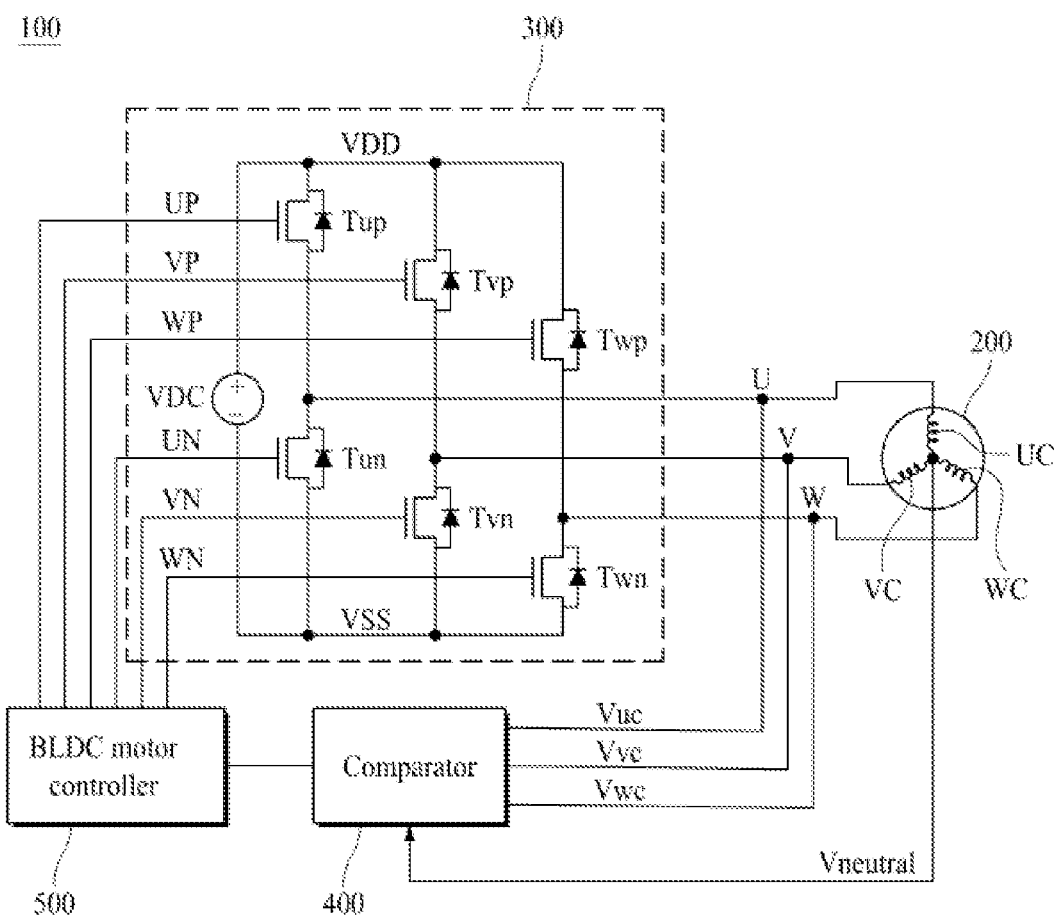
FIG. 1 is a view illustrating a sensorless brushless direct current (BLDC) motor driver according to one embodiment of the present disclosure.

FIG. 1 is a view illustrating a sensorless brushless direct current (BLDC) motor driver according to one embodiment of the present disclosure.

Referring to FIG. 1, a sensorless BLDC motor driver 100 according to one embodiment may include a BLDC motor 200, an inverter 300, a comparator 400, and a BLDC motor controller 500. The BLDC motor controller 500 may be abbreviated as a controller.

The sensorless BLDC motor 200 includes a stator having 3-phase coils UC, VC, and WC with different phases and a rotor using permanent magnets, and in FIG. 1, the rotor is omitted. The stator of the sensorless BLDC motor 200 may include a first coil UC with a U-phase (first phase), a second coil VC with a V-phase (second phase), and a third coil WC with a W-phase (third phase). The BLDC motor 200 is driven by a voltage supplied from the inverter 300 to each of the 3-phase coils UC, VC, and WC, and magnetic forces generated by the first to third coils UC, VC, and WC may rotate the rotor of the BLDC motor 200.

The inverter 300 may be operated according to control of the BLDC motor controller 500 to supply a first power voltage VDD or second power voltage VSS to each of the 3-phase coils UC, VC, and WC of the sensorless BLDC motor 200 through one of first to third nodes U, V, and W, or to float the corresponding coil without supplying the first and second power voltages VDD and VSS thereto.

The inverter 300 receives the first power voltage VDD and the second power voltage VSS from a power supply part VDC. The inverter 300 may receive first-1 and first-2 coil control signals UP and UN, second-1 and second-2 coil control signals VP and VN, and third-1 and third-2 coil control signals WP and WN from the BLDC motor controller 500. The coil control signals UP, UN, VP, VN, WP, and WN supplied from the BLDC motor controller 500 may be pulse width modulation (PWM) signals.

The inverter 300 may include a first driving part which drives the first coil UC of the sensorless BLDC motor 200, and the first driving part may include a first pull-up transistor Tup and a first pull-down transistor Tun which are disposed between and connected to a supply line of the first power voltage VDD and a supply line of the second power voltage VSS in series. A connection node between the first pull-up transistor Tup and the first pull-down transistor Tun may be connected to the first coil UC through a first node U. When the first-1 coil control signal UP supplied from the BLDC motor controller 500 has a gate-on voltage, the first pull-up transistor Tup may be turned on so that the first power voltage VDD may be applied to the first coil UC through the first node U. When the first-2 coil control signal UN supplied from the BLDC motor controller 500 is a gate-on voltage, the first pull-down transistor Tun may be turned on so that the second power voltage VSS may be applied to the first coil UC through the first node U. When both of the first-1 and first-2 coil control signals UP and UN supplied from the BLDC motor controller 500 have gate-off voltages, both of the first pull-up transistor Tup and the first pull-down transistor Tun may be turned off so that the first node U and the first coil UC may enter floating states.

The inverter 300 may include a second driving part which drives the second coil VC of the sensorless BLDC motor 200, and the second driving part may include a second pull-up transistor Tvp and a second pull-down transistor Tvn which are disposed between and connected to the supply line of the first power voltage VDD and the supply line of the second power voltage VSS in series. A connection node between the second pull-up transistor Tvp and the second pull-down transistor Tvn may be connected to the second coil VC through a second node V. When the second-1 coil control signal VP supplied from the BLDC motor controller 500 has a gate-on voltage, the second pull-up transistor Tvp is turned on so that the first power voltage VDD may be applied to the second coil VC through the second node V. When the second-2 coil control signal VN supplied from the BLDC motor controller 500 has a gate-on voltage, the second pull-down transistor Tvn may be turned on so that the second power voltage VSS may be applied to the second coil VC through the second node V. When both of the second-1 and second-2 coil control signals VP and VN supplied from the BLDC motor controller 500 have gate-off voltages, both of the second pull-up transistor Tvp and the second pull-down transistor Tvn are turned off so that both of the second node V and the second coil VC may enter floating states.

The inverter 300 may include a third driving part which drives the third coil WC of the sensorless BLDC motor 200, and the third driving part may include a third pull-up transistor Twp and a third pull-down transistor Twn which are disposed between and connected to the supply line of the first power voltage VDD and the supply line of the second power voltage VSS in series. A connection node between the third pull-up transistor Twp and the third pull-down transistor Twn may be connected to the third coil WC through a third node W. When the third-1 coil control signal WP supplied from the BLDC motor controller 500 has a gate-on voltage, the third pull-up transistor Twp may be turned on so that the first power voltage VDD may be applied to the third coil WC through the third node W. When the third-2 coil control signal WN supplied from the BLDC motor controller 500 has a gate-on voltage, the third pull-down transistor Twn may be turned on so that the second power voltage VSS may be supplied to the third coil WC through the third node W. When both of the third-1 and third-2 coil control signals WP and WN supplied from the BLDC motor controller 500 have gate-off voltages, both of the third pull-up transistor Twp and the third pull-down transistor Twn are turned off so that both of the third node W and the third coil WC may enter floating states.

The comparator 400 may receive voltages Vcu, Vcv, and Vcw of the 3-phase coils UC, VC, and WC through the first to third nodes U, V, and W, respectively, and receive a neutral voltage Vneutral of a node, which is commonly connected to the 3-phase coils UC, VC, and WC, from the sensorless BLDC motor 200. The comparator 400 may compare each of the voltages Vuc, Vvc, and Vwc of the 3-phase coils UC, VC, and WC with the neutral voltage Vneutral and output a comparison result to the BLDC motor controller 500.

Using the comparison result supplied from the comparator 400, the BLDC motor controller 500 may detect a back-electro motive force (BEMF) of each of the 3-phase coils UC, VC, and WC and a zero crossing time point at which the BEMF of any one of the 3-phase coils UC, VC, and WC becomes zero. Whenever the zero crossing time point is detected at each of the 3-phase coils UC, VC, and WC, the BLDC motor controller 500 may control the inverter 300 by applying a transition time (first time) and a turn-on time (second time), which are predetermined based on the detected zero crossing time point, to generate the plurality of coil control signals UP, UN, VP, VN, WP, and WN to change phases.

The 3-phase coils UC, VC, and WC of the sensorless BLDC motor 200 may alternately enter the floating states. When any one coil of the 3-phase coils UC, VC, and WC enters the floating state, a current flowing through the floated coil does not present, but among the voltages Vuc, Vvc, and Vwc of the 3-phase coils UC, VC, and WC, a voltage of the floated coil may be changed to be gradually increased or decreased. The BLDC motor controller 500 may detect a time point at which the voltage of the floated coil becomes the same as the neutral voltage Vneutral, that is, the zero crossing time point at which the BEMF of the floated coil becomes zero. Since the current flowing through the floated coil is not present, the BEMF of the floated coil may be detected using a difference between the voltage of the corresponding coil and the neutral voltage Vneutral. At a point at which the voltage of the floated coil becomes the same as the neutral voltage Vneutral, the BEMF of the floated coil may become zero.

The BLDC motor controller 500 may control the inverter 300 using the zero crossing time point of the BEMF and the predetermined transition time and the predetermined turn-on time of each of the 3-phase coils UC, VC, and WC so that the first power voltage VDD or the second power voltage VSS is supplied to each of the 3-phase coils UC, VC, and WC of the sensorless BLDC motor 200 or the 3-phase coils UC, VC, and WC of the sensorless BLDC motor 200 are floated. The transition time is a time from a time point, at which any one coil of the 3-phase coils UC, VC, and WC is floated and zero crossing of the BEMF of the floated coil occurs, to a time point at which the first power voltage VDD or the second power voltage VSS starts to be supplied to the corresponding coil. The turn-on time is a time for which the first power voltage VDD or the second power voltage VSS is supplied to the corresponding coil, that is, from a time point, at which the first power voltage VDD or the second power voltage VSS starts to be supplied thereto, to a time point at which the floating state, in which both of the first and second power voltages VDD and VSS are not supplied thereto, starts. A floating time of the corresponding coil may be about two times the transition time.

Specifically, among the voltages Vuc, Vvc, and Vwc of the 3-phase coils UC, VC, and WC, when the zero crossing time point, at which a voltage of a floated coil is increased gradually and becomes the same as the neutral voltage Vneutral, is detected, the BLDC motor controller 500 may control the first power voltage VDD to be supplied to the coil in the floating state for the turn-on time after the transition time from a zero crossing detection time point and may float the corresponding coil after the turn-on time. When the zero crossing time point, at which a voltage of a floated coil is decreased gradually and becomes the same as the neutral voltage Vneutral, is detected, the BLDC motor controller 500 may control the second power voltage VSS to be supplied to the coil in the floating state for the turn-on time after the transition time from a zero crossing detection time point and may float the corresponding coil after the turn-on time.

For example, the BLDC motor controller 500 may control the first power voltage VDD to be applied to the first coil UC for the turn-on time through the first pull-up transistor Tup after the transition time from the zero crossing time point at which the voltage Vuc of the floated first coil UC is increased to be the same as the neutral voltage Vneutral and may float the first coil UC after the turn-on time. The BLDC motor controller 500 may control the second power voltage VSS to be applied to the first coil UC for the turn-on time through the first pull-down transistor Tun after the transition time from the zero crossing time point at which the voltage Vuc of the floated first coil UC is decreased to be the same as the neutral voltage Vneutral and may float the first coil UC after the turn-on time.

The BLDC motor controller 500 may control the first power voltage VDD to be applied to the second coil VC for the turn-on time through the second pull-up transistor Tvp after the transition time from the zero crossing time point at which the voltage Vvc of the floated second coil VC is increased to be the same as the neutral voltage Vneutral and may float the second coil VC after the turn-on time. The BLDC motor controller 500 may control the second power voltage VSS to be applied to the second coil VC for the turn-on time through the second pull-down transistor Tvn after the transition time from the zero crossing time point at which the voltage Vvc of the floated second coil VC is decreased to be the same as the neutral voltage Vneutral and may float the second coil VC after the turn-on time.

The BLDC motor controller 500 may control the first power voltage VDD to be applied to the third coil WC for the turn-on time through the third pull-up transistor Twp after the transition time from the zero crossing time point at which the voltage Vwc of the floated third coil WC is increased to be the same as the neutral voltage Vneutral and may float the third coil WC after the turn-on time. The BLDC motor controller 500 may control the second power voltage VSS to be applied to the third coil WC from the turn-on time through the third pull-down transistor Twn after the transition time from the zero crossing time point at which the voltage Vwc of the floated third coil WC is decreased to be the same as the neutral voltage Vneutral and may float the third coil WC after the turn-on time.

Particularly, the BLDC motor controller 500 may operate in a test mode to detect an optimum driving mode, that is, the transition time and the turn-on time in which optimum efficiency is obtained, suitable for driving characteristics and a driving speed of the sensorless BLDC motor driver 100. The BLDC motor controller 500 may set the transition time and the turn-on time detected in the test mode as the transition time and the turn-on time of the optimum driving mode of the sensorless BLDC motor driver 100 to maximize driving efficiency of the BLDC motor driver 100.

The BLDC motor controller 500 may start in a 120 degree driving mode, of which a basic rotation angle is 120 degrees, as a driving mode. The 120 degree driving mode may be set to have the turn-on time of 120 degrees corresponding to a 120 degree rotation section of the sensorless BLDC motor 200 and the transition time of 30 degrees corresponding to a 30 degree rotation section of the sensorless BLDC motor 200.

The BLDC motor controller 500 may repeatedly perform a test method of driving the sensorless BLDC motor 200 using the inverter 300 and detecting a driving error of the sensorless BLDC motor 200 while increasing the turn-on time from 120 degrees to 180 degrees step by step and decreasing the transition time from 30 degrees to 0 degrees step by step in the test mode.

When the driving error of the sensorless BLDC motor 200 is detected, the BLDC motor controller 500 may set a turn-on time and a transition time, which are adjusted at a previous operation, as the turn-on time and the transition time of the optimum driving mode. In other words, the BLDC motor controller 500 may determine a driving mode having a maximum turn-on time and a minimum transition time among turn-on times and transition times, for which the driving error of the sensorless BLDC motor 200 is not detected, as the driving mode with optimum efficiency.

Figure 2:
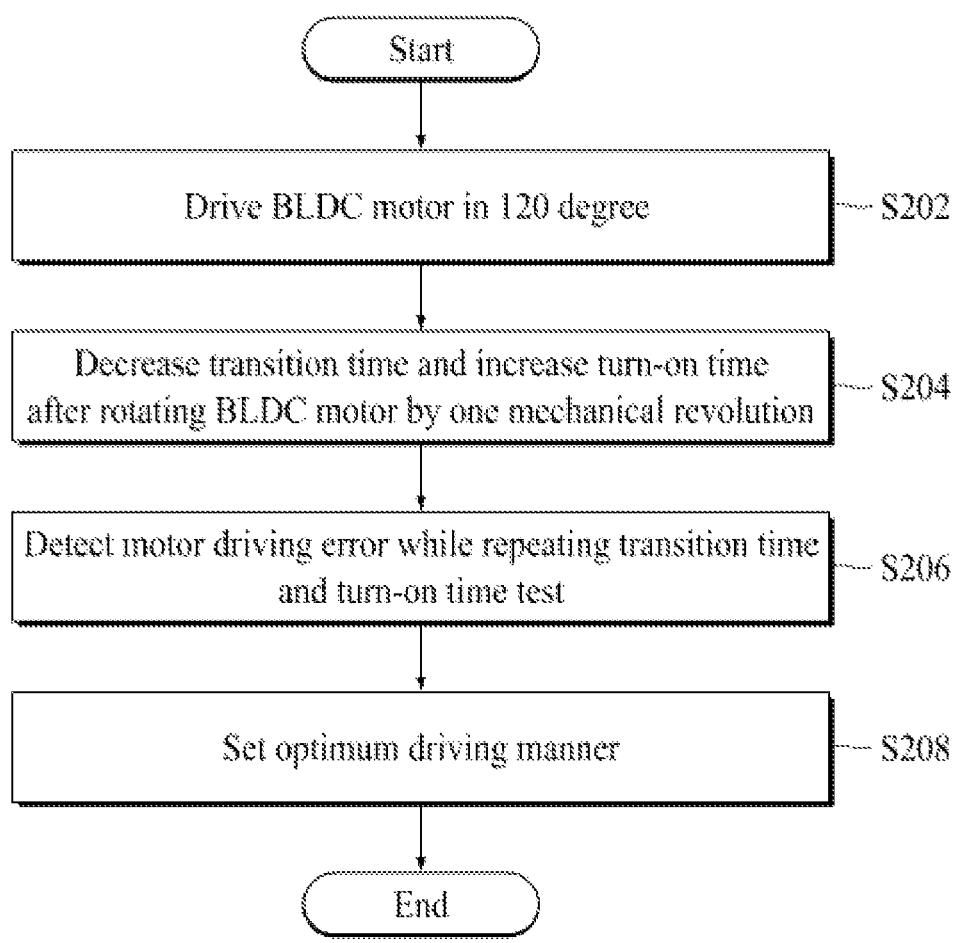
FIG. 2 is a flowchart illustrating a method of testing the sensorless BLDC motor driver according to one embodiment of the present disclosure.

FIG. 2 is a flowchart illustrating a method of testing the sensorless BLDC motor driver according to one embodiment of the present disclosure.

Referring to FIG. 2, the BLDC motor controller 500 may perform an initial driving operation (S202) of driving the sensorless BLDC motor driver 100 in the test mode and driving the BLDC motor driver 100 in the 120 degree driving mode which is a basic driving mode.

The BLDC motor controller 500 adjusts a time by increasing the turn-on time of the test mode step by step and decreasing a transition time of a test mode step by step after rotating the sensorless BLDC motor 200 by one revolution in the 120 degree driving mode using the inverter 300 (S204). The BLDC motor controller 500 may drive the sensorless BLDC motor 200 and detect whether a driving error of the sensorless BLDC motor 200 occurs using an adjusted transition time and an adjusted turn-on time using the inverter 300.

The BLDC motor controller 500 may repeatedly perform a test operation of adjusting the time by increasing the turn-on time of the test mode step by step and decreasing the transition time of the test mode step by step, driving the sensorless BLDC motor 200 using an adjusted transition time and an adjusted turn-on time, and detecting the driving error (S206). The turn-on time of the test mode may be increased from 120 degrees to 180 degrees step by step, and the transition time of the test mode may be decreased from 30 degrees to 0 degrees step by step. When the zero crossing time point of the BEMF of each of the 3-phase coils UC, VC, and WC is not detected using the comparator 400, since the operation of the BLDC motor controller 500 is not changed, it may be determined that a driving error, in which the sensorless BLDC motor 200 does not operate normally, occurs.

While the BLDC motor controller 500 repeatedly performs the test operation of changing the transition time and the turn-on time of the test mode and detecting the driving error of the sensorless BLDC motor 200, when the driving error is detected, the BLDC motor controller 500 may stop the test operation and set a transition time and a turn-on time in an operation, just before the driving error is detected, in the driving mode with optimum efficiency (S208). The driving mode with the optimum efficiency may be set to be suitable for driving characteristics and a driving speed of the BLDC motor driver 100 in the range of 120 degrees to less than 180 degrees.

Figure 3:
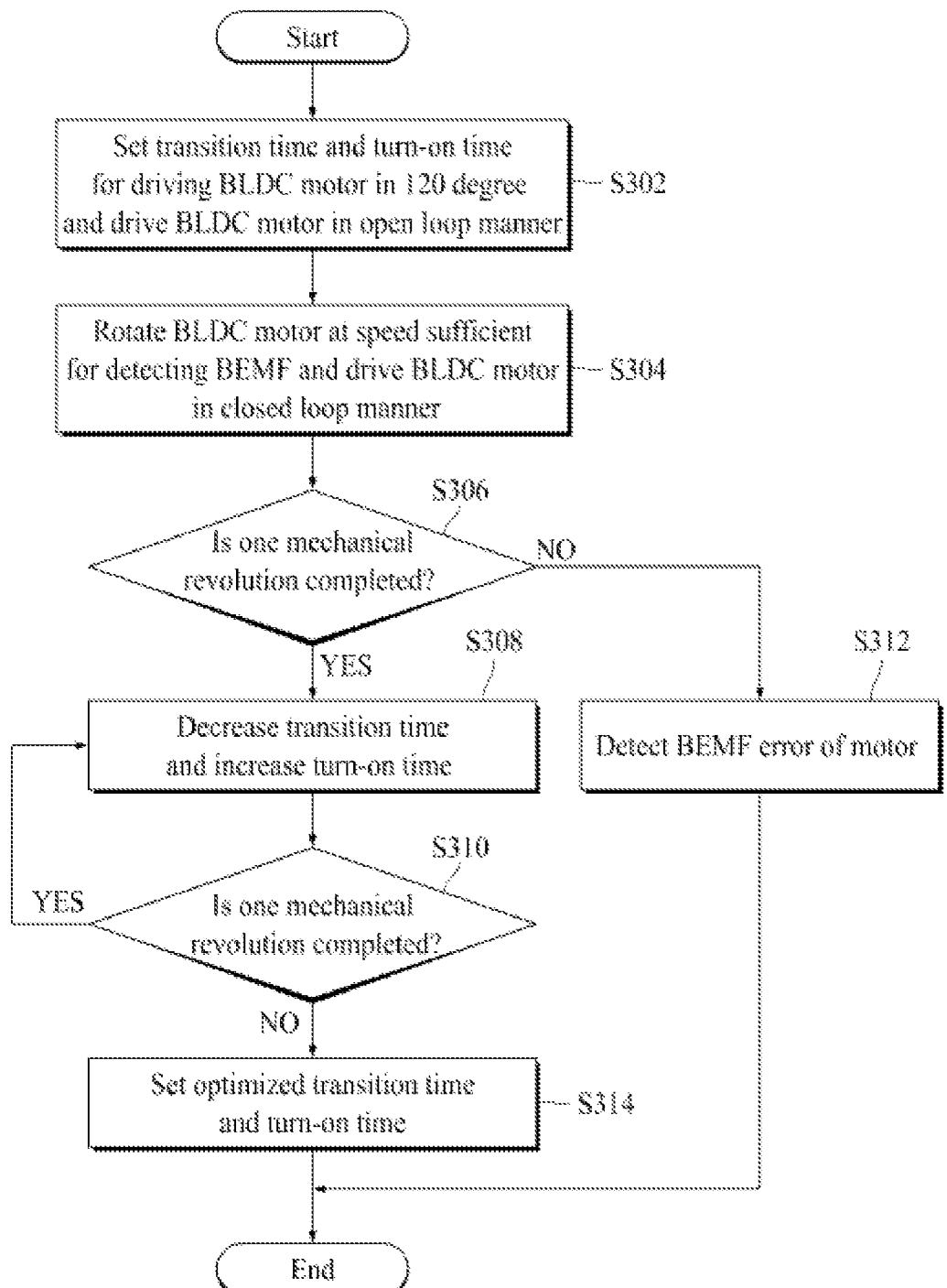
FIG. 3 is a flowchart illustrating a method of testing the sensorless BLDC motor driver according to one embodiment of the present disclosure.

FIG. 3 is a flowchart illustrating a method of testing the sensorless BLDC motor driver according to one embodiment of the present disclosure.

Referring to FIG. 3, the BLDC motor controller 500 may perform an open loop driving operation (S302) of operating the sensorless BLDC motor driver 100 in a test mode, setting a transition time and a turn-on time corresponding to the 120 degree driving mode which is the basic driving mode, and driving the BLDC motor driver 100 in an open loop manner. The 120 degree driving mode may be set to have the turn-on time of 120 degrees and the transition time of 30 degrees. Driving in the open loop manner is to drive in a manner in which the BLDC motor controller 500 supplies the coil control signals UP, UN, VP, VN, WP, and WN, which each have a basic driving pattern, to drive the sensorless BLDC motor 200 using the inverter 300 without detecting the BEMF of each of the 3-phase coils UC, VC, and WC.

The BLDC motor controller 500 may perform a closed loop driving operation (S304) of the 120 degree driving mode of driving the BLDC motor driver 100 in a closed loop manner after rotating the sensorless BLDC motor 200 at a speed sufficient to detect the BEMF of each of the 3-phase coils UC, VC, and WC. Driving in the closed loop manner is to drive in a manner in which the BLDC motor controller 500 detects the BEMF of each of the 3-phase coils UC, VC, and WC using the comparator 400 and drives the sensorless BLDC motor 200 using the zero crossing time point of the BEMF, the set transition time, and the set turn-on time using the inverter 300. Hereinafter, the BLDC motor driver 100 is driven in a closed loop driving manner.

The BLDC motor controller 500 may perform a test operation (S306) of the 120 degree driving mode of detecting the BEMF of each of the 3-phase coils UC, VC, and WC while rotating the sensorless BLDC motor 200 by a certain number of revolutions, for example, one mechanical revolution, in the 120 degree driving mode.

The BLDC motor controller 500 may determine that a driving error of the sensorless BLDC motor 200, in which the BEMF is not detected, occurs when one revolution of the sensorless BLDC motor 200 is not completed (NO) in the test operation S306 of the 120 degree driving mode (S312) and may stop the test operation.

Meanwhile, the BLDC motor controller 500 may repeat the open loop driving operation S302, the closed loop driving operation S304, and the 120 degree driving test operation S306, which are described above, after resetting an initial position of the rotor in the BLDC motor 200 or a driving speed of the BLDC motor driver 100 to be increased.

In the test operation S306 of the 120 degree driving mode, when at least one mechanical revolution of the sensorless BLDC motor 200 is completed (YES), that is, a BEMF detection error does not occur in the 120 degree driving mode, the BLDC motor controller 500 may proceed to a time adjustment operation (S308).

In the time adjustment operation S308, the BLDC motor controller 500 performs time adjustment of decreasing the transition time step by step in the test mode and increasing the turn-on time step by step in the test mode.

The BLDC motor controller 500 may perform a test operation (S310) of the adjusted time of detecting the BEMF of each of the 3-phase coils UC, VC, and WC while rotating the sensorless BLDC motor 200 by a certain number of revolutions, for example, one mechanical revolution, using an adjusted transition time and an adjusted turn-on time using the inverter 300.

In the test operation S310 of the adjusted time, when one mechanical revolution of the sensorless BLDC motor 200 is completed (YES, see S310), the BLDC motor controller 500 may return to the time adjustment operation S308 and may repeat the time adjustment operation S308 and the test operation S310 of the adjusted time.

In the time adjustment operation S308, the BLDC motor controller 500 may increase the turn-on time in the test mode in increments of one degree from 120 degrees to less than 180 degrees and decrease the transition time in the test mode from 30 degrees to more than 0 degrees in increments of at least 0.5 degrees.

In the test operation S310 of the adjusted time, when one mechanical revolution of the sensorless BLDC motor 200 is not completed (NO), the BLDC motor controller 500 determines that a driving error of the sensorless BLDC motor 200, in which the BEMF is not detected, occurs, and proceeds to an optimized time setting operation (S314).

In the optimized time setting operation S314, the BLDC motor controller 500 may set an adjusted transition time and an adjusted turn-on time in an operation, just before the driving error is detected, as a transition time and a turn-on time optimized for driving characteristics and a driving speed of the BLDC motor driver 100 and stop the test operation.

Through the above-described test method, the turn-on time is determined in the range of 120 degrees to less than 180 degrees and the transition time is determined in the range of 30 degrees to more than 0 degrees to be suitable for the driving characteristics and the driving speed of the BLDC motor driver 100 so that driving efficiency of the BLDC motor driver 100 may be maximized.

For example, an optimum driving mode suitable for the BLDC motor driver 100 may be set to a 130 degree driving mode having a turn-on time of 130 degrees and a transition time of 25 degrees. The optimum driving mode suitable for the BLDC motor driver 100 may be set to a 140 degree driving mode having a turn-on time of 140 degrees and a transition time of 20 degrees. The optimum driving mode suitable for the BLDC motor driver 100 may be set to a 150 degree driving mode having a turn-on time of 150 degrees and a transition time of 15 degrees. The optimum driving mode suitable for the BLDC motor driver 100 may be set to a 160 degree driving mode having a turn-on time of 160 degrees and a transition time of 10 degrees. The optimum driving mode suitable for the BLDC motor driver 100 may be set to a 170 degree driving mode having a turn-on time of 170 degree and a transition time of 5 degrees.

Figure 4:
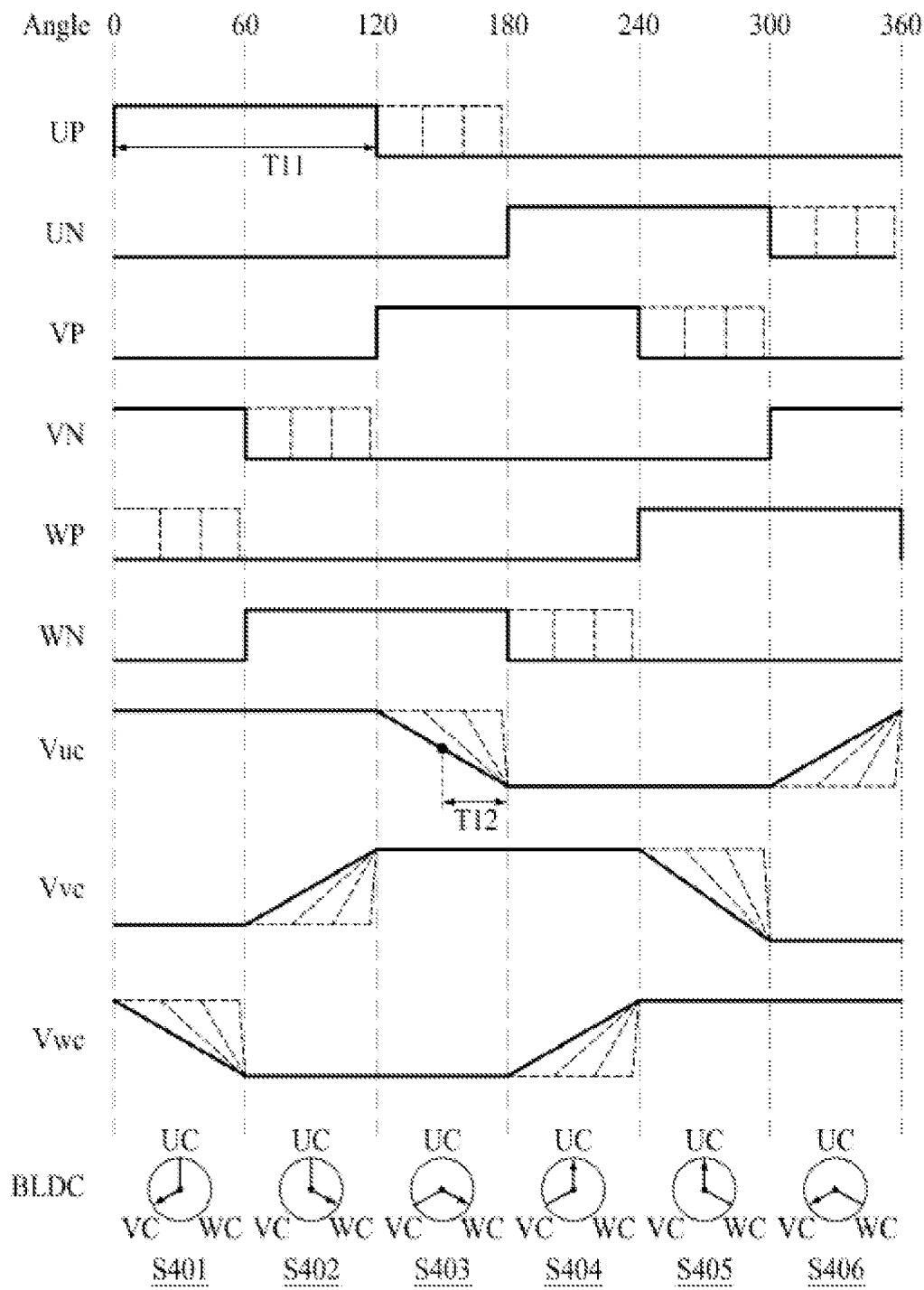
FIG. 4 is a signal waveform diagram showing a method of driving the sensorless BLDC motor according to one embodiment of the present disclosure.

FIG. 4 is a signal waveform diagram showing a method of driving the sensorless BLDC motor according to one embodiment of the present disclosure.

Referring to FIGS. 1 and 4, a turn-on time T11 of the 120 degree driving mode may be a 120 degree time corresponding to a 120 degree rotation section of the sensorless BLDC motor 200, and a transition time T12 may be a 30 degree time corresponding to a 30 degree rotation section of the sensorless BLDC motor 200. The sensorless BLDC motor 200 may operate in the 120 degree driving mode including first to sixth operations (S401 to S406).

In the 120 degree driving mode, a 360 degree cycle of each of the coil control signals UP, UN, VP, VN, WP, and WN supplied to the inverter 300 from the BLDC motor controller 500 to drive one of the 3-phase coils UC, VC, and WC may include a 120 degree turn-on period, for which the gate-on voltage is supplied, and a 240 degree turn-off period for which the gate-off voltage is supplied.

Referring to FIGS. 1 and 4, in the first operation S401 corresponding to a 0 degree to 60 degree rotation section of the sensorless BLDC motor 200, the first power voltage VDD is applied to the first coil UC due to the gate-on voltage of the first-1 coil control signal UP and the gate-off voltage of the first-2 coil control signal UN. The second power voltage VSS is applied to the second coil VC due to the gate-off voltage of the second-1 coil control signal VP and the gate-on voltage of the second-2 coil control signal VN. The third coil UC enters the floating state due to the gate-off voltage of the third-1 coil control signal WP and the gate-off voltage of the third-2 coil control signal WN. A current flows from the first coil UC to the second coil VC. The third-2 coil control signal WN may be activated from the gate-off voltage to the gate-on voltage at a 60 degree time point, at which the transition time T12 of 30 degrees elapsed from the zero crossing time point at which the voltage Vwc of the third coil WC in the floating state is decreased, so that the BEMF becomes zero.

In the second operation S402 corresponding to a 60 degree to 120 degree rotation section of the sensorless BLDC motor 200, the first power voltage VDD is applied to the first coil UC due to the gate-on voltage of the first-1 coil control signal UP and the gate-off voltage of the first-2 coil control signal UN. The second coil VC enters the floating state due to the gate-off voltage of the second-1 coil control signal VP and the gate-off voltage of the second-2 coil control signal VN. The second power voltage VSS is applied to the third coil UC due to the gate-off voltage of the third-1 coil control signal WP and the gate-on voltage of the third-2 coil control signal WN. A current flows from the first coil UC to the third coil WC. The second-1 coil control signal VP may be activated from the gate-off voltage to the gate-on voltage at a 120 degree time point at which the transition time T12 of 30 degrees elapsed from the zero crossing time point at which the voltage Vvc of the second coil VC in the floating state is increased so that the BEMF becomes zero.

In the third operation S403 corresponding to a 120 degree to 180 degree rotation section of the sensorless BLDC motor 200, the first coil UC enters the floating state due to the gate-off voltage of the first-1 coil control signal UP and the gate-off voltage of the first-2 coil control signal UN. The first power voltage VDD is applied to the second coil VC due to the gate-on voltage of the second-1 coil control signal VP and the gate-off voltage of the second-2 coil control signal VN. The second power voltage VSS is applied to the third coil UC due to the gate-off voltage of the third-1 coil control signal WP and the gate-on voltage of the third-2 coil control signal WN. A current flows from the second coil VC to the third coil WC. The first-2 coil control signal UN may be activated from the gate-off voltage to the gate-on voltage at a 180 degree time point at which the transition time T12 of 30 degrees elapsed from the zero crossing time point at which the voltage Vuc of the first coil UC in the floating state is decreased so that the BEMF becomes zero.

In the fourth operation S404 corresponding to a 180 degree to 240 degree rotation section of the sensorless BLDC motor 200, the second power voltage VSS is applied to the first coil UC due to the gate-off voltage of the first-1 coil control signal UP and the gate-on voltage of the first-2 coil control signal UN. The first power voltage VDD is applied to the second coil VC due to the gate-on voltage of the second-1 coil control signal VP and the gate-off voltage of the second-2 coil control signal VN. The third coil UC enters the floating state due to the gate-off voltage of the third-1 coil control signal WP and the gate-off voltage of the third-2 coil control signal WN. A current flows from the second coil VC to the first coil. The third-1 coil control signal WP may be activated from the gate-off voltage to the gate-on voltage at a 240 degree time point at which the transition time T12 of 30 degree elapsed from the zero crossing time point at which the voltage Vwc of the third coil WC in the floating state is increased so that the BEMF becomes zero.

In the fifth operation S405 corresponding to a 240 degree to 300 degree rotation section of the sensorless BLDC motor 200, the second power voltage VSS is applied to the first coil UC due to the gate-off voltage of the first-1 coil control signal UP and the gate-on voltage of the first-2 coil control signal UN. The second coil VC enters the floating state due to the gate-off voltage of the second-1 coil control signal VP and the gate-off voltage of the second-2 coil control signal VN. The first power voltage VDD is applied to the third coil UC due to the gate-on voltage of the third-1 coil control signal WP and the gate-off voltage of the third-2 coil control signal WN. A current flows from the third coil WC to the first coil UC. The second-2 coil control signal VN may be activated from the gate-off voltage to the gate-on voltage at a 300 degree time point at which the transition time T12 of 30 degrees elapsed from the zero crossing time point at which the voltage Vvc of the second coil VC in the floating state is decreased so that the BEMF becomes zero.

In the sixth operation S406 corresponding to a 300 degree to 360 degree rotation section of the sensorless BLDC motor 200, the first coil UC enters the floating state due to the gate-off voltage of the first-1 coil control signal UP and the gate-off voltage of the first-2 coil control signal UN. The second power voltage VSS is applied to the second coil VC due to the gate-off voltage of the second-1 coil control signal VP and the gate-on voltage of the second-2 coil control signal VN. The first power voltage VDD is applied to the third coil UC due to the gate-on voltage of the third-1 coil control signal WP and the gate-off voltage of the third-2 coil control signal WN. A current flows from the third coil WC to the second coil VC. The first-1 coil control signal UP may be activated from the gate-off voltage to the gate-on voltage at a 360 degree (0 degree) time point, at which the transition time T12 of 30 degree elapsed from the zero crossing time point at which the voltage Vuc of the first coil UC in the floating state increases, so that the BEMF becomes zero.

Figure 5:
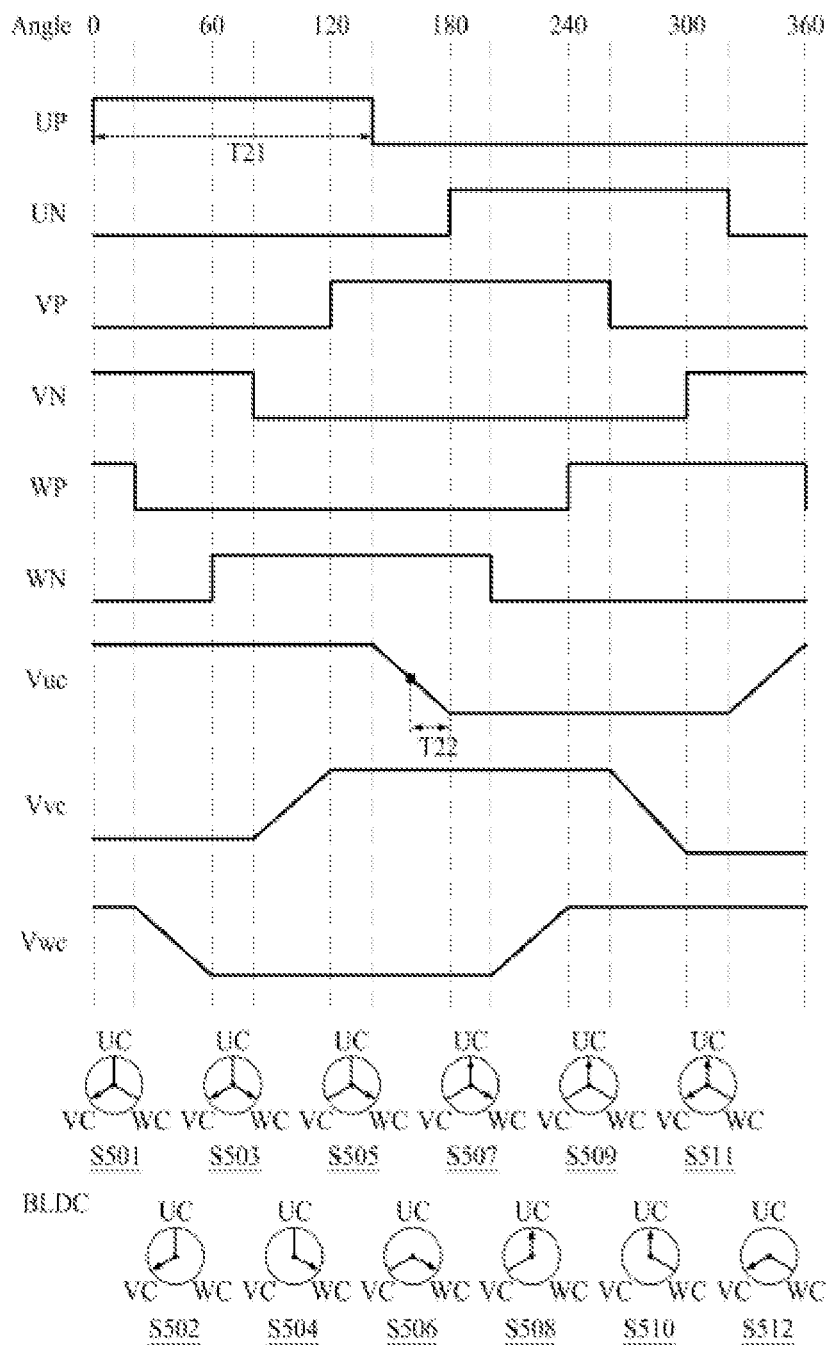
FIG. 5 is a signal waveform diagram showing a method of driving the sensorless BLDC motor according to one embodiment of the present disclosure.
Figure 6:
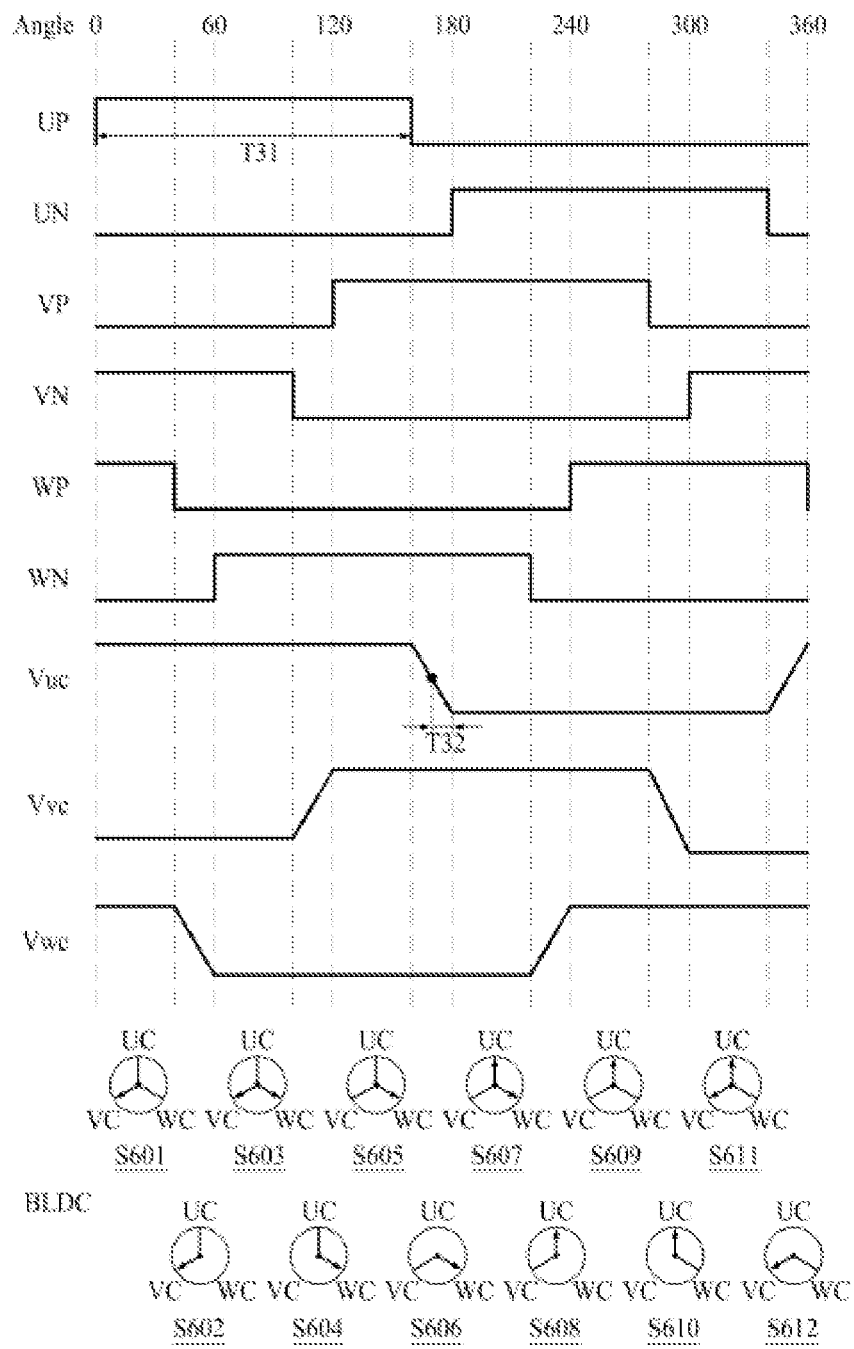
FIG. 6 is a signal waveform diagram showing a method of driving the sensorless BLDC motor according to one embodiment of the present disclosure.

FIGS. 5 and 6 are signal waveform diagrams showing a method of driving the sensorless BLDC motor according to one embodiment of the present disclosure; and Referring to FIGS. 1, 5, and 6, a turn-on time T21 or T31 of a "120+N" (N is a positive integer more than 0 degrees and less than 60 degrees) degree driving mode may be set to be a "120+N" degree time corresponding to a "120+N" degree rotation section of the sensorless BLDC motor 200, and a transition time T22 or T32 may be set to be a 30−N/2 degree time corresponding to a "30−N/2" degree rotation section of the sensorless BLDC motor 200.

For example, in FIG. 5, a 140 degree driving mode in which N=20 may be set to have the turn-on time T21 of 140 degrees and the transition time 20 degrees. In FIG. 6, a 160 degree driving mode in which N=40 may be set to have the turn-on time T31 of 160 degrees, and the transition time of 10 degrees.

In the "120+N" degree driving mode, a 360 degree rotation section of each of the coil control signals UP, UN, VP, VN, WP, and WN supplied to the inverter 300 from the BLDC motor controller 500 in order to drive each of the 3-phase coils UC, VC, and WC may include a "120+N" degree turn-on period for which the gate-on voltage is supplied and a "360−(120+N)" degree turn-off period for which the gate-off voltage is supplied.

The sensorless BLDC motor 200 may operate in the "120+N" degree driving mode including first to twelfth operations S501 to S512 or S601 to S612.

Referring to FIGS. 1, 5, and 6, in the first operation S501 or S601 corresponding to a 0 degree to N degree rotation section of the sensorless BLDC motor 200, the first power voltage VDD is applied to the first coil UC due to the gate-on voltage of the first-1 coil control signal UP and the gate-off voltage of the first-2 coil control signal UN. The second power voltage VSS is applied to the second coil VC due to the gate-off voltage of the second-1 coil control signal VP and the gate-on voltage of the second-2 coil control signal VN. The first power voltage VDD is applied to the third coil UC due to the gate-on voltage of the third-1 coil control signal WP and the gate-off voltage of the third-2 coil control signal WN. A current flows from the first and third coil UC and WC to the second coil VC.

In the second operation S502 or S602 corresponding to an N degree to 60 degree rotation section of the sensorless BLDC motor 200, the first power voltage VDD is applied to the first coil UC due to the gate-on voltage of the first-1 coil control signal UP and the gate-off voltage of the first-2 coil control signal UN. The second power voltage VSS is applied to the second coil VC due to the gate-off voltage of the second-1 coil control signal VP and the gate-on voltage of the second-2 coil control signal VN. The third coil UC enters the floating state due to the gate-off voltage of the third-1 coil control signal WP and the gate-off voltage of the third-2 coil control signal WN. A current flows from the first coil UC to the second coil VC. The third-2 coil control signal WN may be activated from the gate-off voltage to the gate-on voltage at a 60 degree time point at which the transition time T22 or T32 of 30−N/2 degrees elapsed from the zero crossing time point at which the voltage Vwc of the third coil WC in the floating state is decreased so that the BEMF becomes zero.

In the third operation S503 or S603 corresponding to a 60 degree to 60+N degree rotation section of the sensorless BLDC motor 200, the first power voltage VDD is applied to the first coil UC due to the gate-on voltage of the first-1 coil control signal UP and the gate-off voltage of the first-2 coil control signal UN. The second power voltage VSS is applied to the second coil VC due to the gate-off voltage of the second-1 coil control signal VP and the gate-on voltage of the second-2 coil control signal VN. The second power voltage VSS is applied to the third coil UC due to the gate-off voltage of the third-1 coil control signal WP and the gate-on voltage of the third-2 coil control signal WN. A current flows from the first coil UC to the second and third coils VC and WC.

In a fourth operation S504 or S604 corresponding to a 60+N degree to 120 degree rotation section of the sensorless BLDC motor 200, the first power voltage VDD is applied to the first coil UC due to the gate-on voltage of the first-1 coil control signal UP and the gate-off voltage of the first-2 coil control signal UN. The second coil VC enters the floating state due to the gate-off voltage of the second-1 coil control signal VP and the gate-off voltage of the second-2 coil control signal VN. The second power voltage VSS is applied to the third coil UC due to the gate-off voltage of the third-1 coil control signal WP and the gate-on voltage of the third-2 coil control signal WN. A current flows from the first coil UC to the third coil WC. The second-1 coil control signal VP may be activated from the gate-off voltage to the gate-on voltage at a 120 degree time point, at which the transition time T22 or T32 of 30−N/2 degrees elapsed from the zero crossing time point at which the voltage Vvc of the second coil VC in the floating state is decreased, so that the BEMF becomes zero.

In the fifth operation S505 or S605 corresponding to a 120 degree to 120+N degree rotation section of the sensorless BLDC motor 200, the first power voltage VDD is applied to the first coil UC due to the gate-on voltage of the first-1 coil control signal UP and the gate-off voltage of the first-2 coil control signal UN. The first power voltage VDD is applied to the second coil VC due to the gate-on voltage of the second-1 coil control signal VP and the gate-off voltage of the second-2 coil control signal VN. The second power voltage VSS is applied to the third coil UC due to the gate-off voltage of the third-1 coil control signal WP and the gate-on voltage of the third-2 coil control signal WN. A current flows from the first and second coils UC and VC to the third coil WC.

In the sixth operation S506 or S606 corresponding to a 120+N degree to 180 degree rotation section of the sensorless BLDC motor 200, the first coil UC enters the floating state due to the gate-off voltage of the first-1 coil control signal UP and the gate-off voltage of the first-2 coil control signal UN. The first power voltage VDD is applied to the second coil VC due to the gate-on voltage of the second-1 coil control signal VP and the gate-off voltage of the second-2 coil control signal VN. The second power voltage VSS is applied to the third coil UC due to the gate-off voltage of the third-1 coil control signal WP and the gate-on voltage of the third-2 coil control signal WN. A current flows from the second coil VC to the third coil WC. The first-2 coil control signal UN is activated from the gate-off voltage to the gate-on voltage at a 180 degree time point, at which the transition time T22 or T32 of 30−N/2 degrees elapsed from the zero crossing time point at which the voltage Vuc of the first coil UC in the floating state is decreased, so that the BEMF becomes zero.

In the seventh operation S507 or S607 corresponding to a 180 degree to 180+N degree rotation section of the sensorless BLDC motor 200, the second power voltage VSS is applied to the first coil UC due to the gate-off voltage of the first-1 coil control signal UP and the gate-on voltage of the first-2 coil control signal UN. The first power voltage VDD is applied to the second coil VC due to the gate-on voltage of the second-1 coil control signal VP and the gate-off voltage of the second-2 coil control signal VN. The second power voltage VSS is applied to the third coil UC due to the gate-off voltage of the third-1 coil control signal WP and the gate-on voltage of the third-2 coil control signal WN. A current flows from the second coil VC to the first and third coils UC and WC.

In the eighth operation S508 or S608 corresponding to a 180+N degree to 240 degree rotation section of the sensorless BLDC motor 200, the second power voltage VSS is applied to the first coil UC due to the gate-off voltage of the first-1 coil control signal UP and the gate-on voltage of the first-2 coil control signal UN. The first power voltage VDD is applied to the second coil VC due to the gate-on voltage of the second-1 coil control signal VP and the gate-off voltage of the second-2 coil control signal VN. The third coil UC enters the floating state due to the gate-off voltage of the third-1 coil control signal WP and the gate-off voltage of the third-2 coil control signal WN. A current flows from the second coil VC to the first coil UC. The third-1 coil control signal WP may be activated from the gate-off voltage to the gate-on voltage at a 240 degree time point, at which the transition time T22 or T32 of 30−N/2 degrees elapsed from the zero crossing time point at which the voltage Vwc of the third coil WC in the floating state is increased, so that the BEMF becomes zero.

In the ninth operation S509 or S609 corresponding to a 240 degree to 240+N degree rotation section of the sensorless BLDC motor 200, the second power voltage VSS is applied to the first coil UC due to the gate-off voltage of the first-1 coil control signal UP and the gate-on voltage of the first-2 coil control signal UN. The first power voltage VDD is applied to the second coil VC due to the gate-on voltage of the second-1 coil control signal VP and the gate-off voltage of the second-2 coil control signal VN. The first power voltage VDD is applied to the third coil UC due to the gate-on voltage of the third-1 coil control signal WP and the gate-off voltage of the third-2 coil control signal WN. A current flows from the second and third coils VC and WC to the first coil UC.

In the tenth operation S510 or S610 corresponding to a 240+N degree to 300 degree rotation section of the sensorless BLDC motor 200, the second power voltage VSS is applied to the first coil UC due to the gate-off voltage of the first-1 coil control signal UP and the gate-on voltage of the first-2 coil control signal UN. The second coil VC enters the floating state due to the gate-off voltage of the second-1 coil control signal VP and the gate-off voltage of the second-2 coil control signal VN. The first power voltage VDD is applied to the third coil UC due to the gate-on voltage of the third-1 coil control signal WP and the gate-off voltage of the third-2 coil control signal WN. A current flows from the third coil WC to the first coil UC. The second-2 coil control signal VN may be activated from the gate-off voltage to the gate-on voltage at a 300 degree time point, at which the transition time T22 or T32 of 30−N/2 degrees elapsed from the zero crossing time pointe at which the voltage Vvc of the second coil VC in the floating state is decreased, so that the BEMF becomes zero.

In the eleventh operation S511 or S611 corresponding to a 300 degree to 300+N degree rotation section of the sensorless BLDC motor 200, the second power voltage VSS is applied to the first coil UC due to the gate-off voltage of the first-1 coil control signal UP and the gate-on voltage of the first-2 coil control signal UN. The second power voltage VSS is applied to the second coil VC due to the gate-off voltage of the second-1 coil control signal VP and the gate-on voltage of the second-2 coil control signal VN. The first power voltage VDD is applied to the third coil UC due to the gate-on voltage of the third-1 coil control signal WP and the gate-off voltage of the third-2 coil control signal WN. A current flows from the third coil WC to the first and second coils UC and VC.

In the twelfth operation S512 or S612 corresponding to a 300+N degree to 360 degree rotation section of the sensorless BLDC motor 200, the first coil UC enters the floating state due to the gate-off voltage of the first-1 coil control signal UP and the gate-off voltage of the first-2 coil control signal UN. The second power voltage VSS is applied to the second coil VC due to the gate-off voltage of the second-1 coil control signal VP and the gate-on voltage of the second-2 coil control signal VN. The first power voltage VDD is applied to the third coil UC due to the gate-on voltage of the third-1 coil control signal WP and the gate-off voltage of the third-2 coil control signal WN. A current flows from the third coil WC to the second coil VC. The first-1 coil control signal UP may be activated from the gate-off voltage to the gate-on voltage at a 360 degree (0 degree) time point, at which the transition time T22 or T32 of 30−N/2 degrees elapsed from the zero crossing time point at which the voltage Vuc of the first coil UC in the floating state is increased, so that the BEMF becomes zero.

As described above, in the BLDC motor driver and the method of driving the motor according to one embodiment of the present disclosure, a turn-on time and a transition time which are suitable for driving characteristics and a driving speed of the BLDC motor driver can be set by repeating a process of testing a driving error of the BLDC motor while increasing the turn-on time step by step and decreasing the transition time step by step, and driving efficiency of the BLDC motor driver can be maximized by applying the set turn-on time and the set transition time.

It will be understood by those skilled in the art that the disclosure may be performed in other concrete forms without changing the technological scope and essential features.

Therefore, the above-described embodiments should be considered in a descriptive sense only and not for purposes of limitation. The scope of the present disclosure is defined not by the detailed description but by the appended claims, and encompasses all modifications and alterations derived from meanings, the scope, and equivalents of the appended claims.

What is claimed is:

1. A brushless direct current (BLDC) motor driver comprising:
    a BLDC motor including a first coil, a second coil, and a third coil;
    a comparator which compares a voltage of each of the first to third coils with a neutral voltage of a node commonly connected to the first to third coils in the BLDC motor and outputs a comparison result;
    a controller which detects a zero crossing time point of a back-electro motive force of each of the first coil, the second coil, and the third coil using the comparison result of the comparator and generates first to third coil control signals using the detected zero crossing time points and a turn-on time and a transition time in an optimum driving mode; and
    an inverter which supplies a first power voltage or second power voltage to each of the first to third coils or floats the corresponding coil in response to the first to third coil control signals,
    wherein the controller repeatedly performs a process of driving the BLDC motor and detecting a driving error of the BLDC motor while adjusting a turn-on time and a transition time in a test mode step by step, and when the driving error is detected, sets a turn-on time and a transition time, which are adjusted in a previous operation, as the turn-on time and the transition time in the optimum driving mode.

2. The BLDC motor driver of claim 1, wherein the controller:
    increases the turn-on time in the test mode from 120 degrees to less than 180 degrees in a basic driving mode step by step; and
    decreases the transition time in the test mode from 30 degrees to more than 0 degrees in the basic driving mode step by step.

3. The BLDC motor driver of claim 2, wherein:
    the turn-on time in the test mode is increased in increments of one degree step by step from 120 degrees to less than 180 degrees in the basic driving mode; and
    the transition time in the test mode is decreased in increments of 0.5 degrees step by step from 30 degrees to more than 0 degrees in the basic driving mode.

4. The BLDC motor driver of claim 1, wherein:
    a maximum turn-on time among the turn-on times, for which the driving error is not detected in the test mode, is set as the turn-on time of the optimum driving mode; and
    a minimum transition time among the transition times, for which the driving error is not detected, is set as the transition time of the optimum driving mode.

5. The BLDC motor driver of claim 1, wherein, when the zero crossing time point of the back-electro motive force is not detected in the test mode, the controller determines that the driving error occurs.

6. The BLDC motor driver of claim 1, wherein, when the voltage of the floated coil among the first to third coils is increased or decreased and the zero crossing time point of the back-electro motive force of the floated coil is detected, the controller:
    controls the inverter so that the first power voltage or the second power voltage is supplied to the floated coil for the turn-on time in the optimum driving mode after the transition time in the optimum driving mode from the detected zero crossing detection time point; and
    controls the inverter so that the coil, which receives the first power voltage or the second power voltage, is floated after the turn-on time in the optimum driving mode.

7. The BLDC motor driver of claim 1, wherein:
    the turn-on time in the optimum driving mode is set to a "120+N" degree turn-on time corresponding to a time for which the BLDC motor rotates by "120+N" degrees (N is an integer more than 0 and less than 60); and
    the turn-off time of the optimum driving mode is set to a "30−N/2" degree transition time corresponding to a time for which the BLDC motor rotates by "30−N/2" degrees.

8. A method of driving a brushless direct current (BLDC) motor, comprising:
    an initial driving operation of driving the BLDC motor in a basic driving mode in a test mode;
    a test operation of adjusting a turn-on time and a transition time in the test mode step by step, applying the adjusted turn-on time and the adjusted transition time to drive the BLDC motor, and detecting a driving error of the BLDC motor;
    an operation of repeating the test operation when the driving error is not detected in the test operation; and
    an operation, when the driving error is detected in the test operation, of setting the turn-on time and the transition time, which are adjusted in an operation just before the driving error is detected, as a turn-on time and a transition time in an optimum driving mode.

9. The method of claim 8, wherein the initial driving operation includes:
    an operation of setting the BLDC motor in a 120 degree driving mode, which is the basic driving mode, and driving the BLDC motor in an open loop manner; and
    an operation of driving the BLDC motor in the 120 degree driving mode in a closed loop manner.

10. The method of claim 9, wherein the initial driving operation:
    further includes an operation of determining whether to rotate the BLDC motor while rotating the BLDC motor by a certain number of revolutions after the operation of driving the BLDC motor in the closed loop manner; and
    proceeds to the test operation when the BLDC motor rotates by the certain number of revolutions.

11. The method of claim 8, wherein, in the test operation:
the turn-on time in the test mode is increased in increments of one degree step by step from 120 degrees to less than 180 degrees in the basic driving mode; and
the transition time in the test mode is decreased in increments of 0.5 degrees step by step from 30 degree to more than 0 degrees in the basic driving mode.

12. The method of claim 8, wherein:
a maximum turn-on time among the turn-on times, for which the driving error is not detected, is set as the turn-on time in the optimum driving mode; and
a minimum transition time among the transition times, for which the driving error is not detected, is set as the transition time in the optimum driving mode.

13. The method of claim 8, wherein:
the turn-on time in the optimum driving mode is set to a "120+N" degree turn-on time corresponding to a time for which the BLDC motor rotates by "120+N" degrees (N is an integer more than 0 and less than 60); and
the turn-off time of the optimum driving mode is set to a "30−N/2" degree transition time corresponding to a time for which the BLDC motor rotates by "30−N/2" degrees.

14. The method of claim 13, wherein, in a driving mode after the test mode, when the BLDC motor is driven by applying the turn-on time and the transition time in the optimum driving mode, and when a voltage of a floated coil among first to third coils included in the BLDC motor is increased or decreased and a zero crossing time point of a back-electro motive force of the floated coil is detected:
a first power voltage or second power voltage is supplied to the floated coil for the turn-on time in the optimum driving mode after the transition time in the optimum driving mode from the detected zero crossing detection time point; and
the coil, which receives the first power voltage or the second power voltage, is floated after the turn-on time in the optimum driving mode.

* * * * *